United States Patent
Bradley

[11] Patent Number: 5,892,623
[45] Date of Patent: Apr. 6, 1999

[54] MUTLI-COLOR-BAND LIGHT SOURCE

[75] Inventor: Ralph Hampton Bradley, Ossining, N.Y.

[73] Assignee: Philips Electronics North America, New York, N.Y.

[21] Appl. No.: 999,319

[22] Filed: Dec. 29, 1997

[51] Int. Cl.⁶ .................................................. G02B 27/10
[52] U.S. Cl. ..................... 359/618; 359/629; 359/638; 349/7; 348/196; 348/756; 348/757; 348/761; 353/102
[58] Field of Search ..................... 359/618, 629, 359/637, 638, 639, 640; 349/7, 8; 348/196, 761, 756, 757, 766; 353/102, 34

[56] References Cited

U.S. PATENT DOCUMENTS

| | | | |
|---|---|---|---|
| 4,995,702 | 2/1991 | Aruga | 349/8 |
| 5,042,912 | 8/1991 | Sato et al. | 359/638 |
| 5,098,184 | 3/1992 | Van Den Brandt et al. | 353/102 |
| 5,105,265 | 4/1992 | Sato et al. | 348/757 |
| 5,185,712 | 2/1993 | Sato et al. | 359/618 |
| 5,410,370 | 4/1995 | Janssen | 348/756 |
| 5,416,514 | 5/1995 | Janssen et al. | 348/196 |
| 5,428,467 | 6/1995 | Schmidt | 359/40 |
| 5,463,497 | 10/1995 | Murakai et al. | 359/618 |
| 5,479,187 | 12/1995 | Chen | 345/102 |
| 5,508,738 | 4/1996 | Janssen et al. | 348/196 |
| 5,528,318 | 6/1996 | Janssen | 348/756 |
| 5,532,763 | 7/1996 | Janssen et al. | 348/744 |
| 5,548,347 | 8/1996 | Melnik et al. | 348/761 |
| 5,608,467 | 3/1997 | Janssen et al. | 348/744 |
| 5,644,357 | 7/1997 | Cohen et al. | 348/196 |

FOREIGN PATENT DOCUMENTS

| | | | |
|---|---|---|---|
| 0653658 | 5/1995 | European Pat. Off. | G02B 26/10 |
| 1467963 | 3/1977 | United Kingdom | G02F 1/03 |

*Primary Examiner*—Loha Ben
*Attorney, Agent, or Firm*—Robert J. Kraus

[57] ABSTRACT

A light source for projecting rectangular color light bands includes a white-light source, a color separation device for separating the white light into red, green and blue components, and separate optics for forming images of rectangular red, green and blue light bands at predetermined positions. The light source is particularly useful in projection television apparatus having single panel light valves.

6 Claims, 1 Drawing Sheet

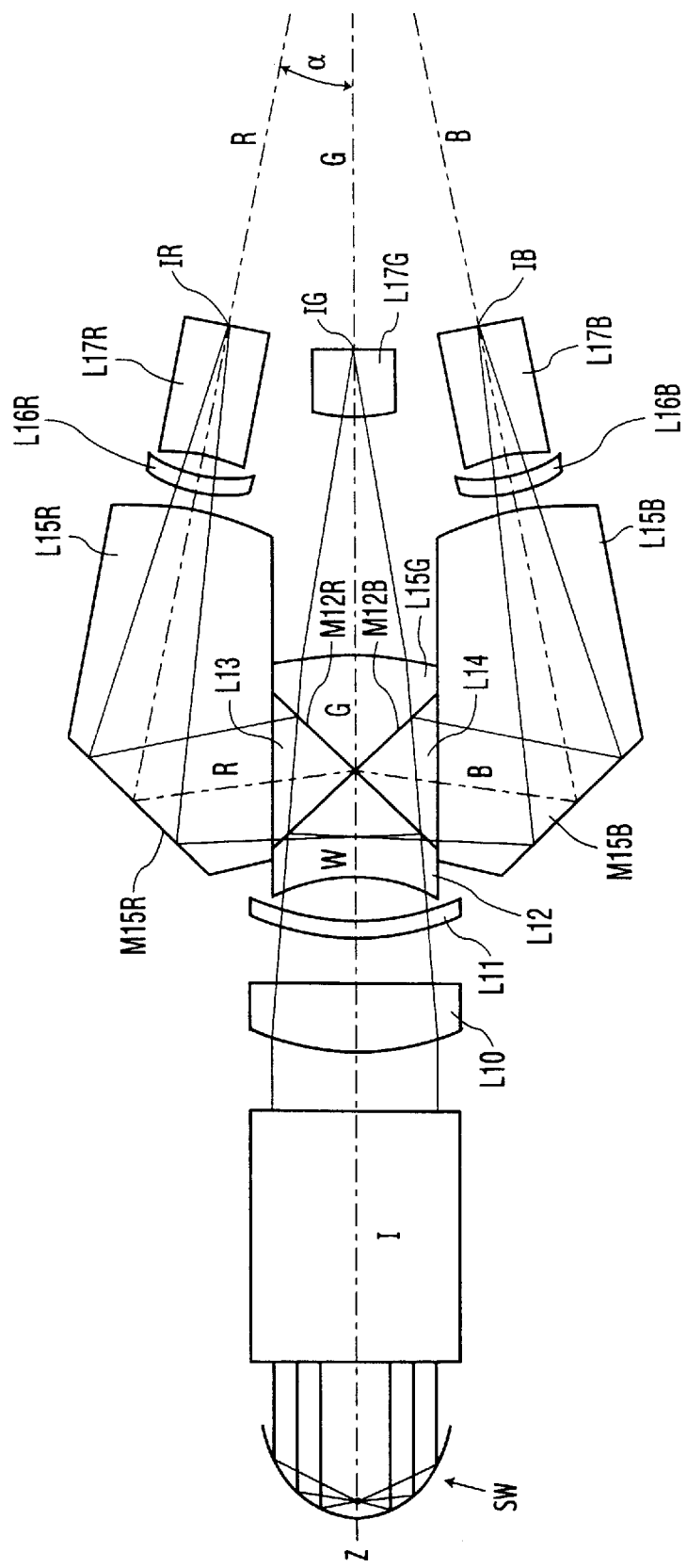
THE FIGURE

MUTLI-COLOR-BAND LIGHT SOURCE

BACKGROUND OF THE INVENTION

1. Field of the Invention

This invention relates to a multiple-color-band light source and, in particular, to such a light source which is especially useful with video projection systems for scrolling such light bands across a single-panel light valve.

2. Description of Related Art

U.S. Pat. No. 5,548,347, which is hereby incorporated by reference, discloses a number of systems in which light from an intense white light source, for example an arc lamp, is collected, and separated using dichroic filters into light bands of the primary colors, i.e. red, green and blue. The color-separated light bands are arrayed adjacently, with each band being narrower in one direction, e.g. the "vertical" direction, and wider in another direction, e.g. the "horizontal" direction. Scanning optics are employed to cause the three bands of light to be imaged onto a light-valve panel. This arrangement proves very effective when utilizing a matrix display panel such as, for example, a liquid crystal display (LCD) panel. Regardless of what type of light-valve panel is utilized, the scanning optics cause the bands of illumination to move across the panel. As each band passes over the "top" of the active area of the panel, a band of light of that color typically leaves the "bottom" of the panel. Accordingly, there is a continual sweep of the three colors across the panel.

Prior to each color band passing over a given row of pixels on the panel, that row will have been addressed with the appropriate brightness information for that color. Each row of the panel is addressed three times for each video field which is to be displayed.

The simultaneous use of a substantial portion of the available red, green and blue light through a single light valve panel provides optical efficiencies comparable to that of three-panel systems employing the same types of light-valve panels. Using only a single panel eliminates the need to mechanically converge different color images, formed on separate panels, and further reduces system cost. Additionally, beam-combining dichroic filters are not needed which leads to further cost savings. The various scanning systems disclosed in U.S. Pat. No. 5,548,347 have many advantages, particularly optical efficiency. The only color-band light source disclosed in detail in that patent, however, is complicated to manufacture and produces color bands which follow light paths of uncompensated different lengths to facets of a rotatable prism and contribute to entendue problems.

SUMMARY OF THE INVENTION

It is an object of the invention to provide a multicolor light source for projecting different color light bands having a predetermined shape. In accordance with the invention, the light source comprises a white light source including an aperture, having the predetermined shape, through which white light illumination rays are passed. Lens means is provided for converging the white light illumination rays and color separation means is provided for separating the converging white light illumination rays into color components to form first, second and third color illumination rays. A first lens means directs the first color illumination rays along a first path to form a respective color image at a predetermined first position. A second lens means directs the second color illumination rays along a second path to form a respective color image at a predetermined second position A third lens means directs the third color illumination rays along a third path to form a respective color image at a predetermined third position. The first and second paths are physically longer than the thid path. The first, second and third paths are through respective combinations of optical mediums which have substantially equal total equivalent thicknesses.

BRIEF DESCRIPTION OF THE DRAWING

The FIGURE is a diagram, not to scale, of an embodiment of a multiple-color-band light source in accordance with the invention.

DESCRIPTION OF THE PREFERRED EMBODIMENTS

The FIGURE is a side view of an exemplary embodiment of a multiplecolor-band light source in accordance with the invention. The light source includes a first arrangement of optical elements for producing illumination rays of white light and a second arrangement of optical elements for producing from this white light red, green and blue light bands.

The first arrangement includes a white-light source SW, an optical integrator I, and a lens L10. The source SW produces illumination rays of white light directed along an axis X to the integrator I. A white-light source which will work well in this arrangement is the PHILIPS UHP lamp, but alternative sources, such as xenon or mercury arc-discharge lamps, may also be used.

The integrator I forms an illuminated aperture having the desired shape of each of the colored light bands to be formed. See, for example, U.S. Pat. No. 5,098,184, which is hereby incorporated by reference, for a known integrator of this type. A rectangular shape is typically used for scanning across light-valve panels, but other shapes are also possible. The integrator I can also be configured to polarize the white light, if polarized light bands are desired. Such bands are sometimes beneficial, for example, with liquid crystal light valves. Preferably such polarization will be done with polarization recovery (i.e. by passing light rays with the desired polarization and rotating other rays to such polarization). This will maximize brightness of polarized light bands. Such optical integrators are well known in the art.

The lens L10 begins the convergence of the white light rays leaving the optical integrator. After leaving this lens, the white light, and then the red, green and blue components of the white light, will continue to converge, along respective paths W, R, G and B, until focused red, green and blue images of the aperture produced by the integrator are formed by the second optical arrangement at the positions IR, IG and IB, respectively.

The second optical arrangement includes a set of mirrors M12R and M12B, for separating the white light into red, green and blue primary-color components, and a set of mirrors M15R and M15B, for cooperating with the mirrors M12R and M12B, to direct the red and blue light components along the respective paths R and B. It also includes an arrangement of lenses L12, L13, L14, L15R, L15G, L15B, L17R, L17G and L17B. Note that, as used in this application, the word "lens" is to be construed generally and includes any transmissive optical element having an entrance or exit surface, regardless of whether such surface or surfaces have plano or curved shapes.

Lenses L12, L13 and L14, together with mirrors M12R and M12B, form a color separation device. Mirror M12R is a segmented dichroic mirror, with segments disposed on faces of L12 and L13, for reflecting red light and passing green and blue light. Mirror M12B is a segmented dichroic mirror, with segments disposed on faces of L12 and L14, for reflecting blue light and passing red and green light. Alternatively, segments of the mirrors M12R and M12B may be disposed on any other combination of the surfaces of lenses L12, L13, L14, L15G which are in positions where the mirrors are to be formed.

Lens L15G directs the green light, passing through the mirrors M12R and M12B, along path G to lens L17G. Lens L15R, together with mirror M15R, directs the red light, reflected by mirror M12R, along path R to lens L17R. Similarly, lens L15B, together with mirror M15B, directs the blue light, reflected by mirror M12B, along path B to lens L17B. Preferably the mirrors M15R and M15B, which are disposed on respective surfaces of lenses L15R and L15B, are dichroic. Alternatively, these mirrors may be less expensively formed, e.g. metallized, but dichroic mirrors have better reflective efficiency for the respective color wavelength, i.e. red or blue in this embodiment. As another alternative, the mirrors M15R and M15B may be formed by the corresponding surfaces of lenses L15R and L15B themselves, acting in a total internal reflection mode.

A principal function of lenses L13, L14, L15R, L15G, L15B, L17R, L17G and L17B is to achieve approximate optically-equivalent total thicknesses of the mediums through which the red, green and blue light components propagate along the respective paths R, G and B to the positions IR, IG and IB. The equivalent thickness $t_e$ of an optical medium is generally equal to $t_m/\eta$, where $t_m$ is the physical thickness of the medium and $\eta$ is the refractive index of the medium. The total equivalent thickness $T_e$ for each path is determined approximately by summing the equivalent thicknesses $t_e$ of the mediums (i.e. lenses and air gaps) through which central rays propagate along the paths R, G and B. These paths begin where the mirrors M12R and M12B cross. Note that the physical length of the green path G is substantially shorter than that of the red and blue paths. However, a higher percentage of each of the red and blue path lengths is filled with lens material having a higher-refractive-index than air, than is the green path length. Note that entrance and/or exit surfaces of many of the lenses in the second optical arrangement are curved. These curved surfaces, together with additional lenses L11, L16R and L16B, are provided as desired to provide optical power and to correct for optical aberrations, which invariably result when optical mediums are inserted in a light path.

The multiple-color-band light source of the FIGURE is ideally suited for projecting the light bands along paths toward facets of a rotatable prism, which is used in scanning systems such as those disclosed in a U.S. patent application filed concurrently with this patent application, under docket number 1504–1230, which is hereby incorporated by reference. In those systems, outer light band paths (e.g. red and blue) converge toward a center band path (e.g. green) at an angle α which is dependent, inter alia, on the number of prism facets. The light paths are also directed toward an axis of rotation of the prism. The light source of the FIGURE is easily adapted to direct the different color light paths at a range of different selected angles α by correspondingly changing the angles at which the paths are directed through the second optical arrangement. In those scanning systems, it is also preferable that the distances from the band images (formed at positions IR, IG, IB) be equidistant from the axis of rotation of the prism. This is easily achievable with the light source of the FIGURE by either adjusting the lengths of the lenses L17R, L17G, L17B or by optically changing the positions IR, IG, IB away from the exit surfaces of the respective lenses, as necessary. Such optical changes can be done, for example, by changing the thickness, position and/or surface curvature of one or more lenses in the source.

What is claimed is:

1. A multicolor light source for projecting different color light bands having a predetermined shape, said light source comprising:

a. a white light source including an aperture, having said predetermined shape, through which white light illumination rays are passed;

b. lens means for converging the white light illumination rays;

c. color separation means for separating the converging white light illumination rays into color components to form first, second and third color illumination rays;

d. first lens means for directing the first color illumination rays along a first path to form a respective color image at a predetermined first position;

e. second lens means for directing the second color illumination rays along a second path to form a respective color image at a predetermined second position;

f. third lens means for directing the third color illumination rays along a third path to form a respective color image at a predetermined third position, said third path being physically shorter than the first and second paths;

said first, second and third paths being through respective combinations of optical mediums which have substantially equal total equivalent thicknesses.

2. A light source as in claim 1 where the white light source includes means for polarizing said white light illumination rays.

3. A light source as in claim 1 where said first, second and third paths converge after leaving the respective first, second and third lens means.

4. A multicolor light source for projecting different color light bands having a predetermined shape, said light source comprising:

a. a first optical arrangement including means for producing an aperture of predetermined shape illuminated with white light;

b. a second optical arrangement including:

i. color separation means for separating white light illumination rays from the aperture into color components to form first, second and third color illumination rays;

ii. first lens means for directing the first color illumination rays along a first path to form a respective color image at a predetermined first position;

iii. second lens means for directing the second color illumination rays along a second path to form a respective color image at a predetermined second position;

iv. third lens means for directing the third color illumination rays along a third path to form a respective color image at a predetermined third position, said third path being physically shorter than the first and second paths;

said first, second and third paths being through respective combinations of optical mediums which have substantially equal total equivalent thicknesses;

one of said first and second optical arrangements including lens means for converging the white light illumination rays to form said color images.

5. A light source as in claim 4 where the first optical arrangement includes means for polarizing said white light illumination rays.

6. A light source as in claim 4 where said first, second and third paths converge after leaving the respective first, second and third lens means.

* * * * *

UNITED STATES PATENT AND TRADEMARK OFFICE
CERTIFICATE OF CORRECTION

PATENT NO. : 5,892,623
DATED : April 6, 1999
INVENTOR(S) : RALPH HAMPTON BRADLEY It is certified that error appears in the above-identified patent and that said Letters Patent is hereby corrected as shown below:

Column 1, before the first paragraph insert:

--This invention was made with United States Government support under Award 70NANB5H1070, entitled "High Information Content Display Technology", awarded by the Department of Commerce through its National Institute of Science & Technology (NIST).--

Signed and Sealed this

Thirty-first Day of August, 1999

*Attest:*

Q. TODD DICKINSON

*Attesting Officer*  *Acting Commissioner of Patents and Trademarks*